US012533977B1

(12) United States Patent
Hao et al.

(10) Patent No.: US 12,533,977 B1
(45) Date of Patent: Jan. 27, 2026

(54) POWER SPLITTER BASED ON MULTIFUNCTIONAL OBCM

(71) Applicant: GM Global Technology Operations LLC, Detroit, MI (US)

(72) Inventors: Lei Hao, Shelby Township, MI (US); Minh-Khai Nguyen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/934,344

(22) Filed: Nov. 1, 2024

(51) Int. Cl.
*B60L 53/24* (2019.01)
*B60L 53/16* (2019.01)
*B60L 53/53* (2019.01)
*B60L 53/57* (2019.01)
*B60L 55/00* (2019.01)
*H02J 7/02* (2016.01)

(52) U.S. Cl.
CPC ............. *B60L 53/24* (2019.02); *B60L 53/16* (2019.02); *B60L 53/53* (2019.02); *B60L 53/57* (2019.02); *B60L 55/00* (2019.02); *H02J 7/02* (2013.01); *B60L 2210/10* (2013.01); *B60L 2210/30* (2013.01); *B60L 2210/40* (2013.01); *H02J 2207/20* (2020.01)

(58) Field of Classification Search
CPC ...................................................... B60L 53/24
See application file for complete search history.

(56) References Cited

U.S. PATENT DOCUMENTS

| | | | |
|---|---|---|---|
| 2013/0200697 A1* | 8/2013 | Fukushige | B60L 53/24 310/254.1 |
| 2014/0354240 A1* | 12/2014 | Wang | B60L 3/0046 320/136 |
| 2020/0091753 A1* | 3/2020 | Maruyama | H02M 7/217 |
| 2020/0298722 A1* | 9/2020 | Smolenaers | H02J 7/345 |
| 2021/0101494 A1* | 4/2021 | Lee | B60L 53/60 |
| 2022/0289057 A1* | 9/2022 | Tsuchiya | B60L 53/20 |
| 2024/0308379 A1* | 9/2024 | Prasad | B60L 53/63 |
| 2024/0367553 A1* | 11/2024 | Ling | B60L 58/27 |

* cited by examiner

*Primary Examiner* — Daniel Kessie
(74) *Attorney, Agent, or Firm* — Honigman LLP; Matthew H. Szalach; Jonathan P. O'Brien

(57) ABSTRACT

An onboard charging system for an electric vehicle includes a charging port configured to receive a single-phase AC power, a power outlet configured to provide the single-phase AC power to one or more external devices, a single-phase inverter connected to the power outlet and configured to provide power splitting functionality, a DC battery selectively coupled to the charging port, a bidirectional inverter configured to convert AC power to DC power and to convert DC power to AC power, the bidirectional inverter is selectively coupled to the battery, an electric motor coupled to the bidirectional inverter and selectively coupled to the charging port, a DC-AC converter selectively coupled to the electric motor and selectively coupled to the power outlet, and a DC-DC converter coupled to the DC-AC converter and selectively coupled to the battery.

20 Claims, 8 Drawing Sheets

POWER SPLITTER BASED ON MULTIFUNCTIONAL OBCM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to electric vehicles and, more particularly to onboard charging systems of electric vehicles.

Electric vehicles use high-voltage batteries to power one or more electric machines and thereby deliver torque to the vehicle's driveline, either alone or in conjunction with an internal combustion engine. The term "plug-in vehicle" describes any vehicle, e.g., battery electric, hybrid electric, for instance by plugging a charging cable from the vehicle into a 120 volts alternating current (VAC) or 240 VAC wall socket.

An onboard charging module (OBCM) may be used to facilitate recharging of the high-voltage battery. A typical OBCM has the required electronic circuit hardware and control software to convert single-phase or three-phase alternating current (AC) grid voltage into a direct current (DC) voltage usable by the battery.

SUMMARY

This section provides a general summary of the means and methods associated with the invention and is not a comprehensive disclosure of its full scope or all its features.

One aspect of the disclosure provides an electric vehicle including a charging port configured to receive a single-phase alternating current (AC) power, a power outlet configured to provide the single-phase AC power to one or more external devices, a single-phase inverter connected to the power outlet to convert direct current (DC) power to single-phase AC power, a DC battery selectively coupled to the charging port via a first switch and a second switch, a bidirectional inverter configured to convert AC power to DC power and to convert DC power to AC power, the bidirectional inverter is selectively coupled to the battery via a third switch, a fourth switch, and a fifth switch, an electric motor coupled to the bidirectional inverter and selectively coupled to the charging port via a sixth switch, a DC-AC converter selectively coupled to the electric motor via a seventh switch and an eighth switch and selectively coupled to the power outlet via a ninth switch, and a tenth switch, a DC-DC converter coupled to the DC-AC converter and selectively coupled to the battery via a twelfth switch and a thirteenth switch, wherein the charging port is selectively coupled to the bidirectional inverter, the electric motor, or the DC-AC converter via a fourteenth switch, and a processor configured to control operation of the first switch, the second switch, the third switch, the fourth switch, the fifth switch, the sixth switch, the seventh switch, the eighth switch, the ninth switch, the tenth switch, the twelfth switch, the thirteenth switch, and the fourteenth switch based on an operation mode of the electric vehicle.

Implementations of the disclosure may include one or more of the following optional features. In some implementations, the single-phase AC power is 120 Vrms AC power.

During a vehicle to vehicle DC boost mode of the electric vehicle, the processor causes the first switch, the second switch, the third switch, the seventh switch, the ninth switch, the tenth switch, the twelfth switch, and the thirteenth switch to be in an open position and the fourth switch, the fifth switch, the sixth switch, and the fourteenth switch to be in a closed position.

During a vehicle to vehicle buck mode of the electric vehicle, the processor causes the first switch, the second switch, the third switch, the fourth switch, the fifth switch, the ninth switch, and the tenth switch to be in an open position and the sixth switch, the seventh switch, the eighth switch, the twelfth switch, the thirteenth switch, the fourteenth switch, to be in a closed position.

During a vehicle to load inverter module mode of the electric vehicle, the processor causes the first switch, the second switch, the third switch, the fourth switch, the fifth switch, the sixth switch, the seventh switch, the eighth switch, and the fourteenth switch to be in an open position and the ninth switch, the tenth switch, the twelfth switch, and the thirteenth switch to be in a closed position.

During a vehicle to grid of the electric vehicle, the processor causes the first switch, the second switch, the third switch, the fourth switch, the fifth switch, the ninth switch, and the tenth switch to be in an open position and the sixth switch, the seventh switch, the eighth switch, the twelfth switch, the thirteenth switch, and the fourteenth switch to be in a closed position.

During a vehicle to home of the electric vehicle, the processor causes the first switch, the second switch, the third switch, the fourth switch, the fifth switch, the ninth switch, and the tenth switch to be in an open position and the sixth switch, the seventh switch, the eighth switch, the twelfth switch, the thirteenth switch, and the fourteenth switch to be in a closed position.

During an AC charging mode of the electric vehicle, the processor causes the third switch, the fourth switch, the fifth switch, the ninth switch, the tenth, the first switch, and the second switch to be in an open position and the twelfth switch, the thirteenth switch, the fourteenth switch, the sixth switch, the seventh switch, and the eighth switch to be in a closed position.

During a propulsion mode of the electric vehicle, the processor causes the first switch, the second switch, the sixth switch, the seventh switch, the eighth switch, the ninth switch, the tenth switch, the twelfth switch, the thirteenth switch, and the fourteenth switch to be in an open position and first close the third switch, and the fifth switch to pre-charge the inverter capacitor and then open third switch and close fourth.

During a direct current fast charging mode of the electric vehicle, the processor causes the third switch, the fourth switch, the fifth switch, the sixth switch, the seventh switch, the eighth switch, the ninth switch, the tenth switch, the twelfth switch, the thirteenth switch, and the fourteenth switch to be in an open position and the first switch and the second switch to be in a closed position.

Another aspect of the disclosure provides an onboard charging system for an electric vehicle, the onboard charging system including a charging port configured to receive a single-phase alternating current (AC) power, a power outlet configured to provide the single-phase AC power to one or more external devices, a single-phase inverter connected to the power outlet and configured to provide power splitting functionality, a direct current (DC) battery selectively coupled to the charging port via a first switch and a second switch, a bidirectional inverter configured to convert AC power to DC power and to convert DC power to AC power, the bidirectional inverter is selectively coupled to the battery via a third switch, a fourth switch, and a fifth switch, an electric motor coupled to the bidirectional inverter and selectively coupled to the charging port via a sixth switch, a DC-AC converter selectively coupled to the electric motor via an seventh switch and an eighth switch and selectively coupled to the power outlet via a ninth switch, and a tenth switch, and a DC-DC converter coupled to the DC-AC converter and selectively coupled to the battery via a twelfth switch and a thirteenth switch, and wherein the charging port is selectively coupled to the battery via the thirteenth switch.

Implementations of the disclosure may include one or more of the following optional features. In some implementations, the single-phase AC power is 120 Vrms AC power.

A positive terminal of the charging port is selectively coupled to a stator winding of the electric motor between the bidirectional inverter and the electric motor via the sixth switch, and a negative terminal of the charging port is selectively coupled between capacitors of the bidirectional inverter via a fourteenth switch.

A positive terminal of the charging port is selectively coupled to three sub switches via the sixth switch, the three sub switches are each selectively coupled to separate stator windings of the electric motor.

The aspect of the disclosure may include a processor that is configured to monitor temperatures of the stator windings and selectively control the three sub switches to prevent any of the stator windings from exceeding a threshold temperature.

A positive terminal of the charging port is selectively coupled to a neutral point of stator windings of the electric motor via the sixth switch, and a negative terminal of the charging port is selectively coupled to insulated gate bipolar transistors that are connected in parallel to the bidirectional inverter, the DC-AC converter, and the DC-DC converter via a fourteenth switch.

A positive terminal of the charging port is selectively coupled to a neutral point of stator windings of the electric motor via the sixth switch, and a negative terminal of the charging port is selectively coupled between capacitors of the bidirectional inverter via a fourteenth switch.

Another aspect of the disclosure provides a power splitter for an onboard charging system for an electric vehicle, the power splitter including a single-phase inverter connected to a power outlet of the onboard charging system, the onboard charging system including a charging port configured to receive a single-phase alternating current (AC) power, a single-phase inverter connected to the power outlet and configured to provide power splitting functionality, a direct current (DC) battery selectively coupled to the charging port via a first switch and a second switch, a bidirectional inverter configured to convert AC power to DC power and to convert DC power to AC power, the bidirectional inverter is selectively coupled to the battery via a third switch, a fourth switch, and a fifth switch, an electric motor coupled to the bidirectional inverter and selectively coupled to the charging port via a sixth switch, a DC-AC converter selectively coupled to the electric motor via an seventh switch and an eighth switch and selectively coupled to the power outlet via a ninth switch, and a tenth switch, and a DC-DC converter coupled to the DC-AC converter and selectively coupled to the battery via a twelfth switch and a thirteenth switch, and wherein the charging port is selectively coupled to the battery via the thirteenth switch.

Implementations of the disclosure may include one or more of the following optional features. In some implementations, one or more pre-charge resistors are disposed between the third switch and the bidirectional inverter.

The single-phase AC power is 120 Vrms AC power.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1A:
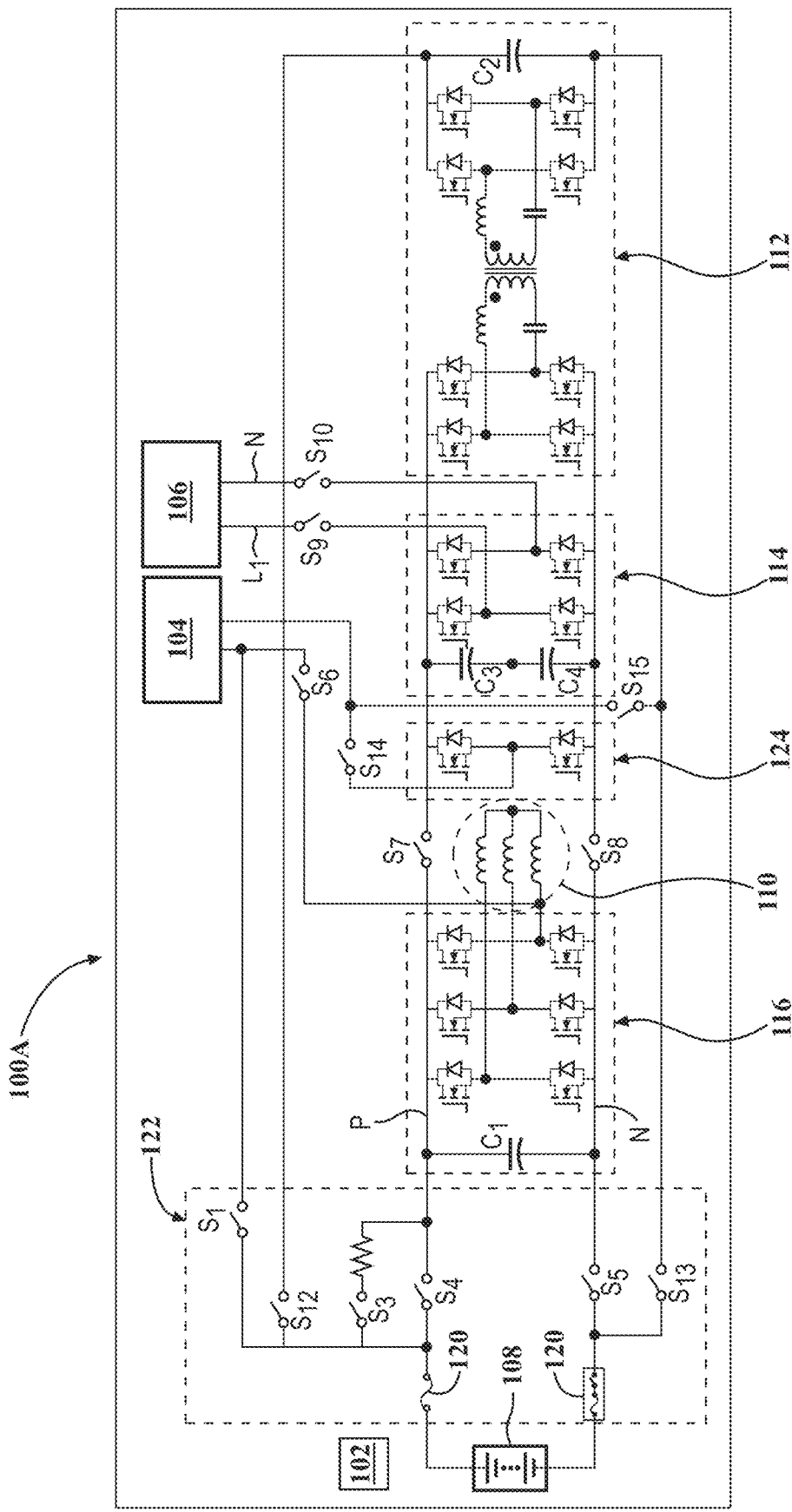
FIG. 1A is a schematic circuit diagram of an onboard charging system of an electric vehicle in accordance with the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1A-1G, exemplary circuit diagrams of an onboard charging system 100, 100A-G in accordance with the principles of the present disclosure are generally shown. The onboard charging system 100 may be incorporated in a vehicle. The onboard charging system 100 includes a processor, a charging port 104, a power outlet 106, a battery 108, and an electric motor 110. In at least one configuration, the vehicle is a hybrid vehicle that utilizes an internal combustion engine and an electric motor. In another configuration, the vehicle is an electric vehicle that only utilizes electric motors. The vehicle may be configured to be connected, via the charging port 104, to a single-phase or three phase AC power source, for charging the battery 108. The electric motor 110 may be configured to receive power from the battery 108 to provide propulsion for the vehicle. In at least one configuration, the battery 108 may be configured to supply direct-current (DC) power to an inverter, which converts the DC power into three-phase alternating-current (AC) power. The three-phase AC power is supplied to the electric motor 110 for propulsion of the vehicle.

In one configuration, as shown in FIG. 1A, a positive terminal of the charging port 104 of the onboard charging system 100A is selectively coupled to a stator winding of the electric motor 110 between the bidirectional inverter 116 and the electric motor 110 via a sixth switch $S_6$. A negative terminal of the charging port 104 of the onboard charging system 100 is selectively coupled to half bridge switches 124 (i.e., IGBTs), which are connected in parallel to the bidirectional inverter 116, the DC-AC converter 114, and the DC-DC converter 112 via a fourteenth switch $S_{14}$. Additionally, the positive terminal of the charging port 104 is selectively coupled to the battery via a first switch $S_1$ and the negative terminal is selectively coupled to the battery via a second switch $S_2$ and connected to the mid-point of the half bridge switches 124 via fifteenth switch $S_{15}$.

Figure 1B:
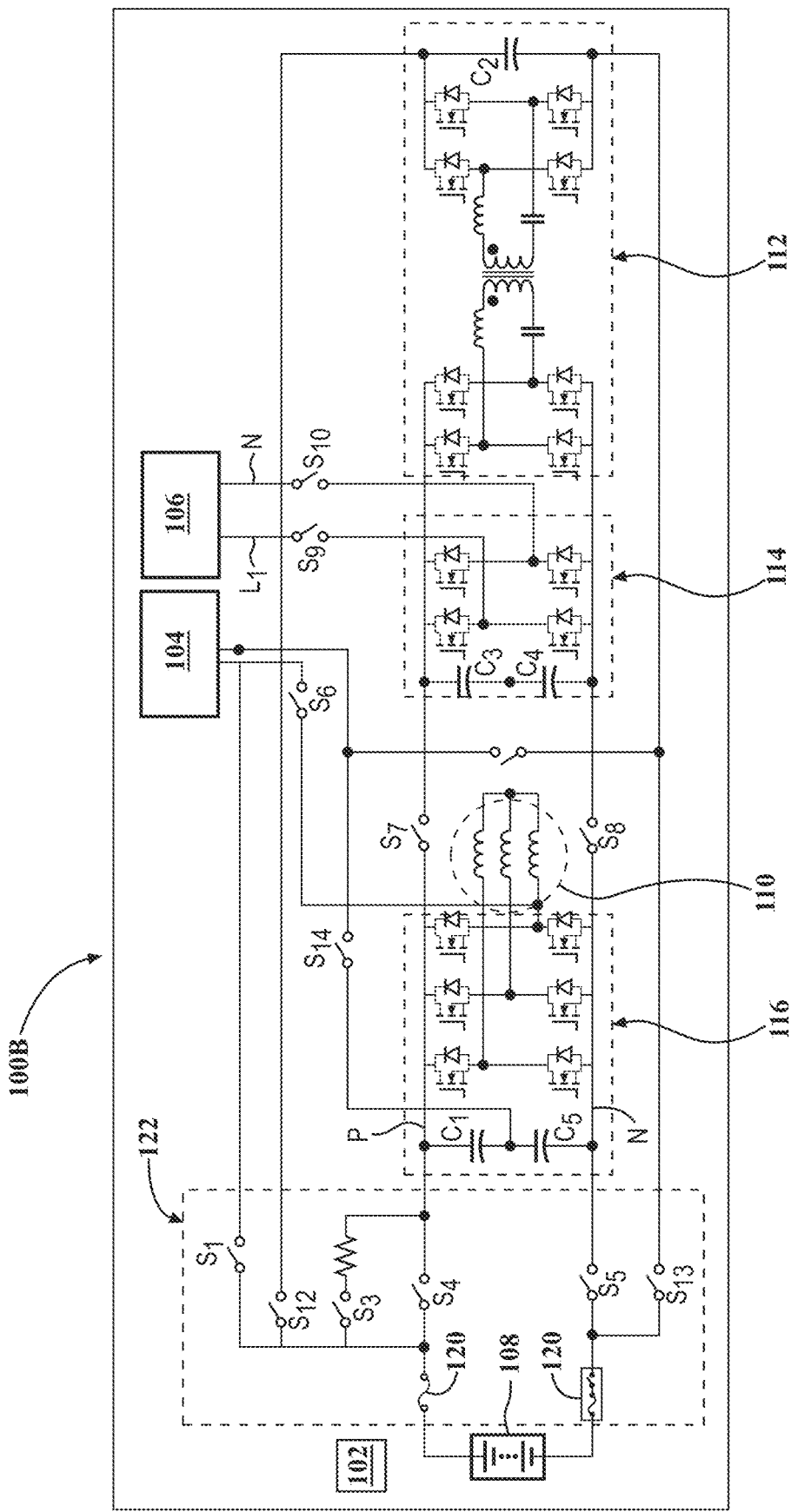
FIG. 1B is a schematic circuit diagram of an onboard charging system of an electric vehicle in accordance with the principles of the present disclosure.

In one configuration, as shown in FIG. 1B, a positive terminal of the charging port 104 of the onboard charging system 100B is selectively coupled, via a sixth switch $S_6$, between one of the stator windings of the electric motor 110 and the bidirectional inverter 116. In this configuration, the capacitor of the bidirectional inverter 116 is split into two capacitors $C_1$, $C_5$ and a negative terminal of the charging port 104 of the onboard charging system 100B is selectively coupled, via a fourteenth switch $S_{14}$ and a fifteenth switch $S_{15}$, between the capacitors $C_1$, $C_5$ of the bidirectional inverter 116. Additionally, the positive terminal of the charging port 104 is selectively coupled to the battery via a first switch $S_1$ and the negative terminal is selectively coupled to the battery via a second switch $S_2$.

Figure 1C:
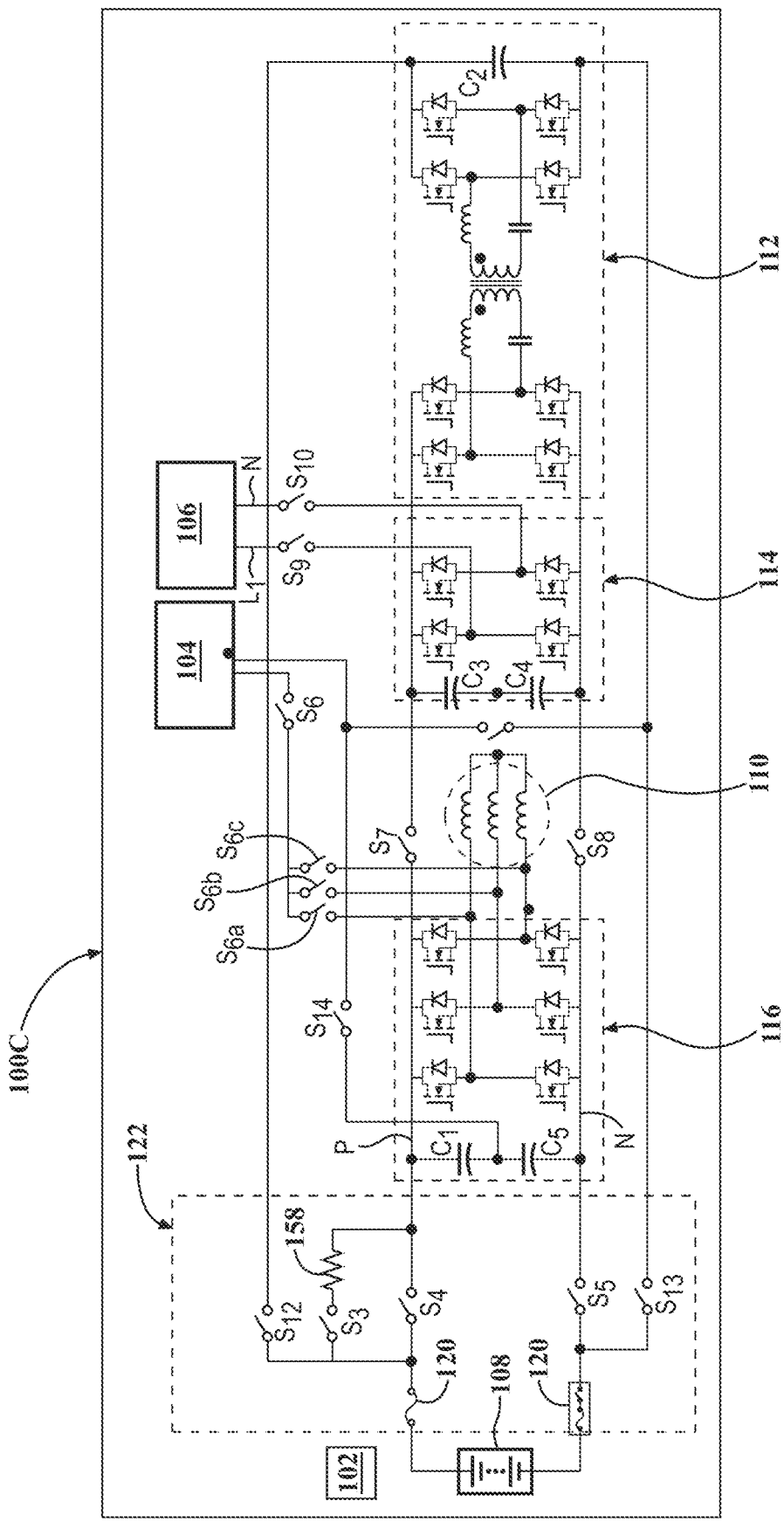
FIG. 1C is a schematic circuit diagram of an onboard charging system of an electric vehicle in accordance with the principles of the present disclosure.

In some cases, the configuration shown in FIG. 1B may cause one of the stator windings of the electric motor 110 that is connected to the positive terminal of the charging port 104 to become hot, which can negatively impact the charging performance and/or the performance of the electric motor 110. Accordingly, in another configuration, as shown in FIG. 1C, a positive terminal of the charging port 104 of the onboard charging system 100C is selectively coupled, via a sixth switch $S_6$, to three separate sub-switches $S_{6a}$, $S_{6b}$, $S_{6c}$ which are selectively coupled between the stator windings of the electric motor 110 and the bidirectional inverter 116. In this configuration, the three sub-switches $S_{6a}$, $S_{6b}$, $S_{6c}$ are actively controlled by a processor 102 such that only one of the three sub-switches $S_{6a}$, $S_{6b}$, $S_{6c}$ is closed at any time. The processor 102 is configured to monitor the temperatures of the stator windings of the electric motor 110 and to selectively control the three sub-switches $S_{6a}$, $S_{6b}$, $S_{6c}$ to prevent any of the stator windings of the electric motor 110 from exceeding a threshold temperature. In this configuration, the capacitor of the bidirectional inverter 116 is split into two capacitors $C_1$, $C_5$ and a negative terminal of the charging port 104 of the onboard charging system 100C is selectively coupled, via a fourteenth switch $S_{14}$ and a fifteenth switch $S_{15}$, between the two capacitors $C_1$, $C_5$ of the bidirectional inverter 116.

Figure 1D:
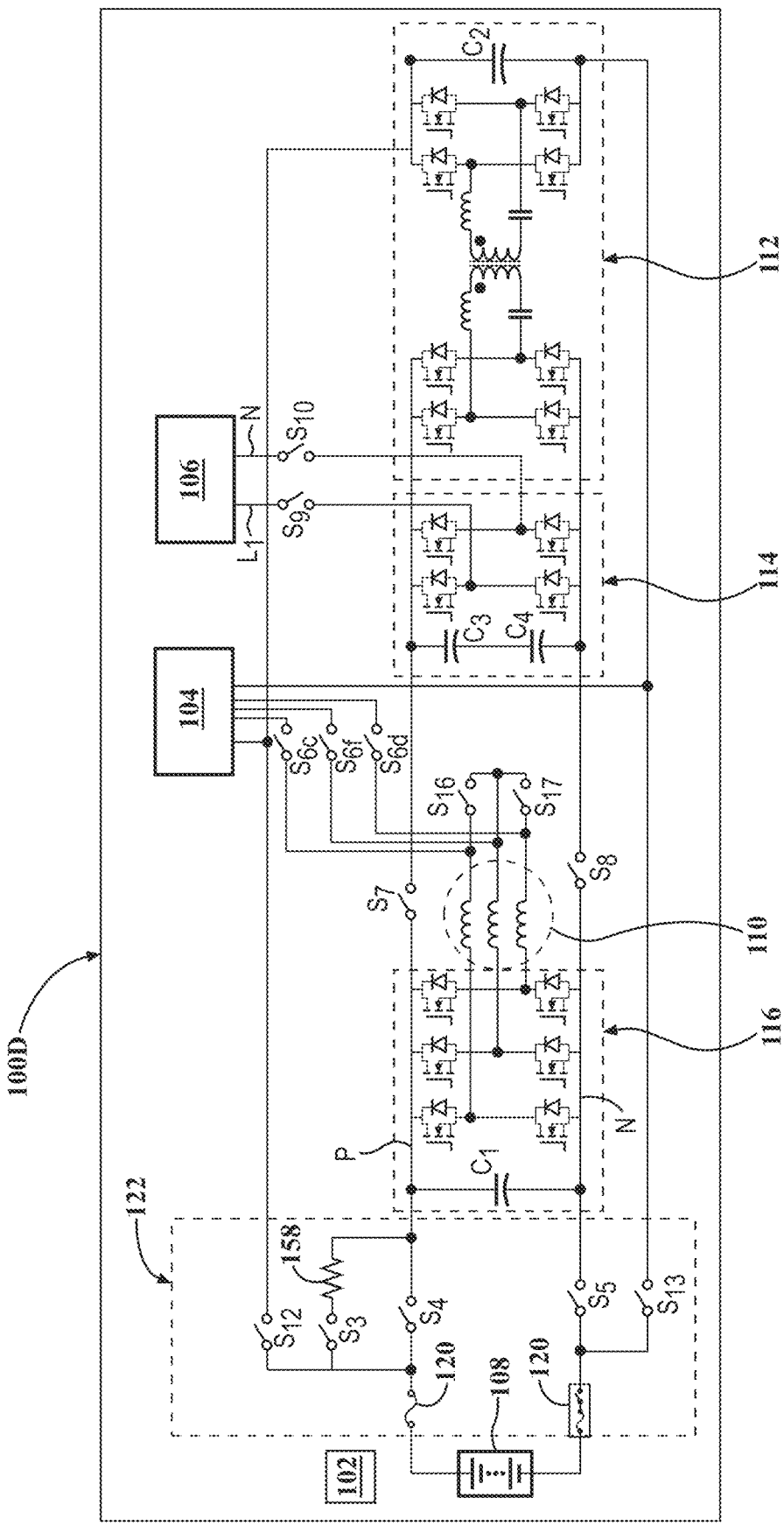
FIG. 1D is a schematic circuit diagram of an onboard charging system of an electric vehicle in accordance with the principles of the present disclosure.

In one configuration, as shown in FIG. 1D, the charging port 104 of the onboard charging system 100D may be configured for three-phase and is selectively coupled to the stator windings of the electric motor 110 via three switches $S_{6e}$, $S_{6a}$, $S_{6f}$ between the electric motor 110 and relay switches (i.e., a sixteenth switch $S_{16}$ and a seventeenth switch $S_{17}$). Additionally, the positive terminal of the charging port 104 is selectively coupled to the battery via the twelfth switch $S_{12}$ and the negative terminal is selectively coupled to the battery via the thirteenth switch 513.

Figure 1E:
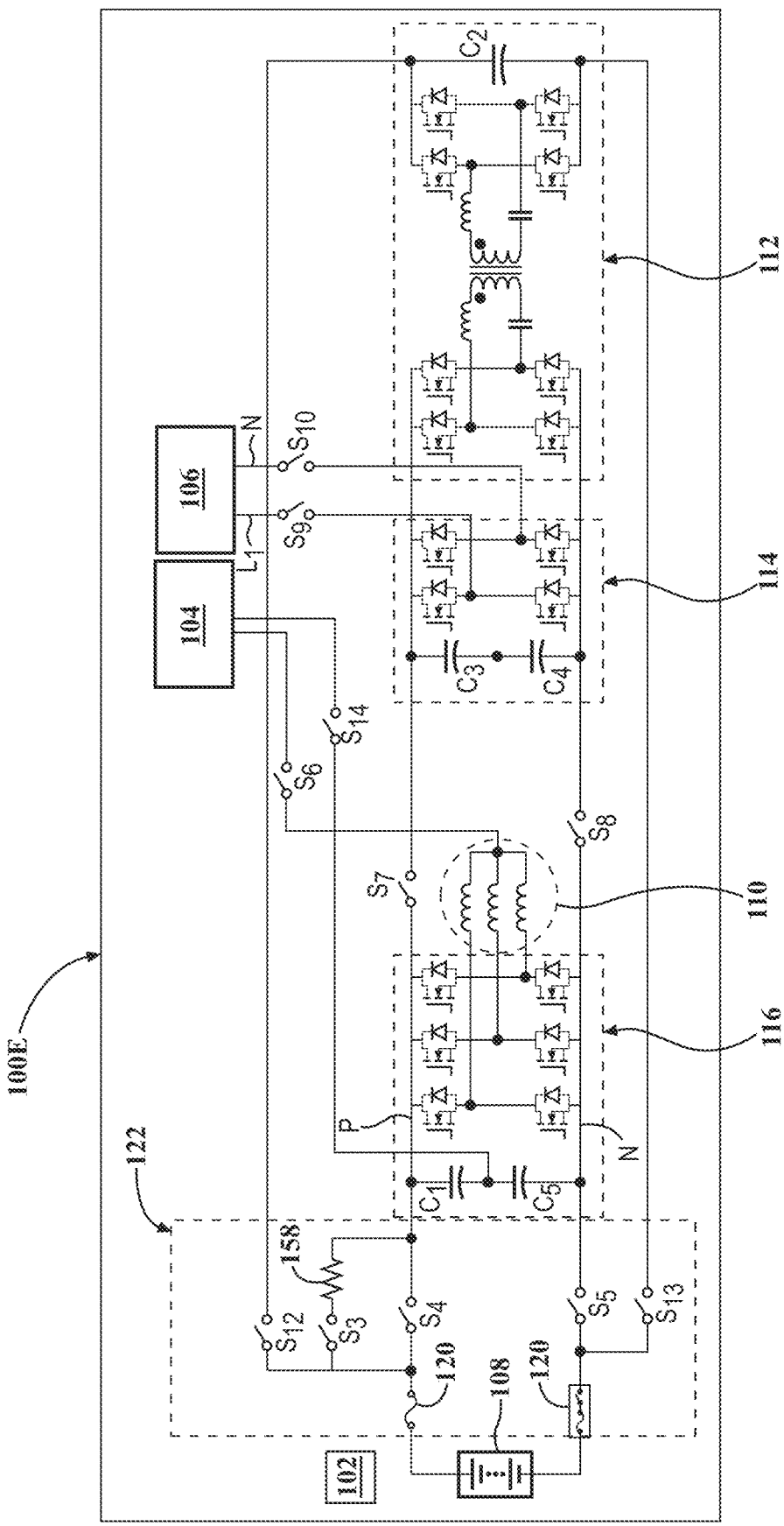
FIG. 1E is a schematic circuit diagram of an onboard charging system of an electric vehicle in accordance with the principles of the present disclosure.

In one configuration, as shown in FIG. 1E, a positive terminal of the charging port 104 of the onboard charging system 100E is selectively coupled to a neutral point of the stator windings of the electric motor 110 via a sixth switch $S_6$. In this configuration, the capacitor of the bidirectional inverter 116 is split into two capacitors $C_1$, $C_5$ and a negative terminal of the charging port 104 the onboard charging system 100E is selectively coupled, via a fourteenth switch 514, between the capacitors $C_1$, $C_5$ of the bidirectional inverter 116.

Figure 1F:
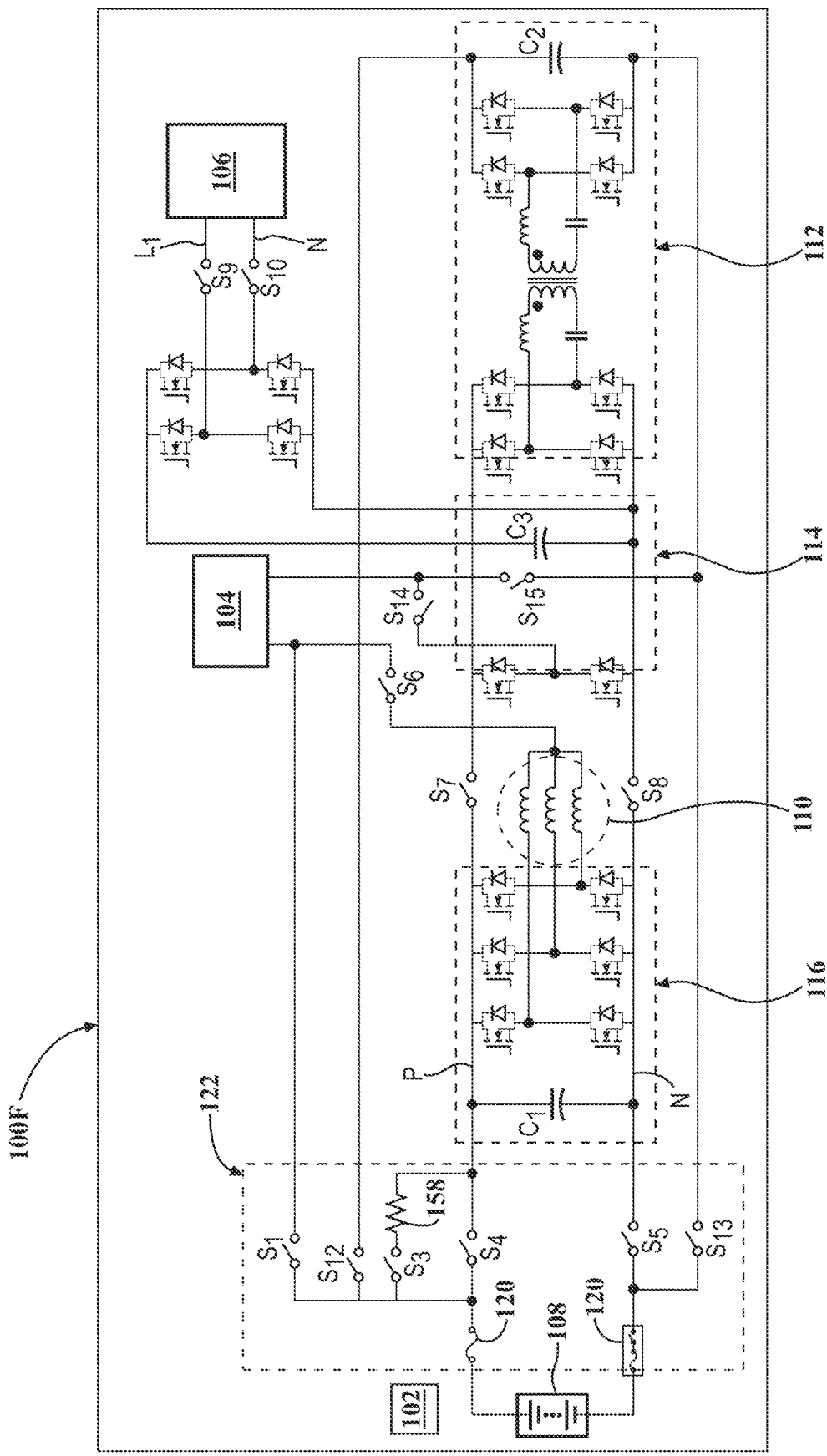
FIG. 1F is a schematic circuit diagram of an onboard charging system of an electric vehicle in accordance with the principles of the present disclosure.

In one configuration, as shown in FIG. 1F, a positive terminal of the charging port 104 of the onboard charging system 100F is selectively coupled to a neutral point of the stator windings of the electric motor 110 via a sixth switch $S_6$. A negative terminal of the charging port 104 of the onboard charging system 100F is selectively coupled to IGBTs, which are connected in parallel to the bidirectional inverter 116, the DC-AC converter 114, and the DC-DC converter 112 via a fourteenth switch $S_{14}$ and fifteenth switch $S_{15}$. Additionally, the positive terminal of the charging port 104 is selectively coupled to the battery via the first switch $S_1$ and the negative terminal is selectively coupled to the battery via the thirteenth switch $S_{13}$. The onboard charging system 100F includes a single-phase inverter 126 disposed adjacent to the power outlet 106. The single-phase inverter 126 is configured to provide power splitting functionality with one hundred and twenty VAC power capability.

Figure 1G:
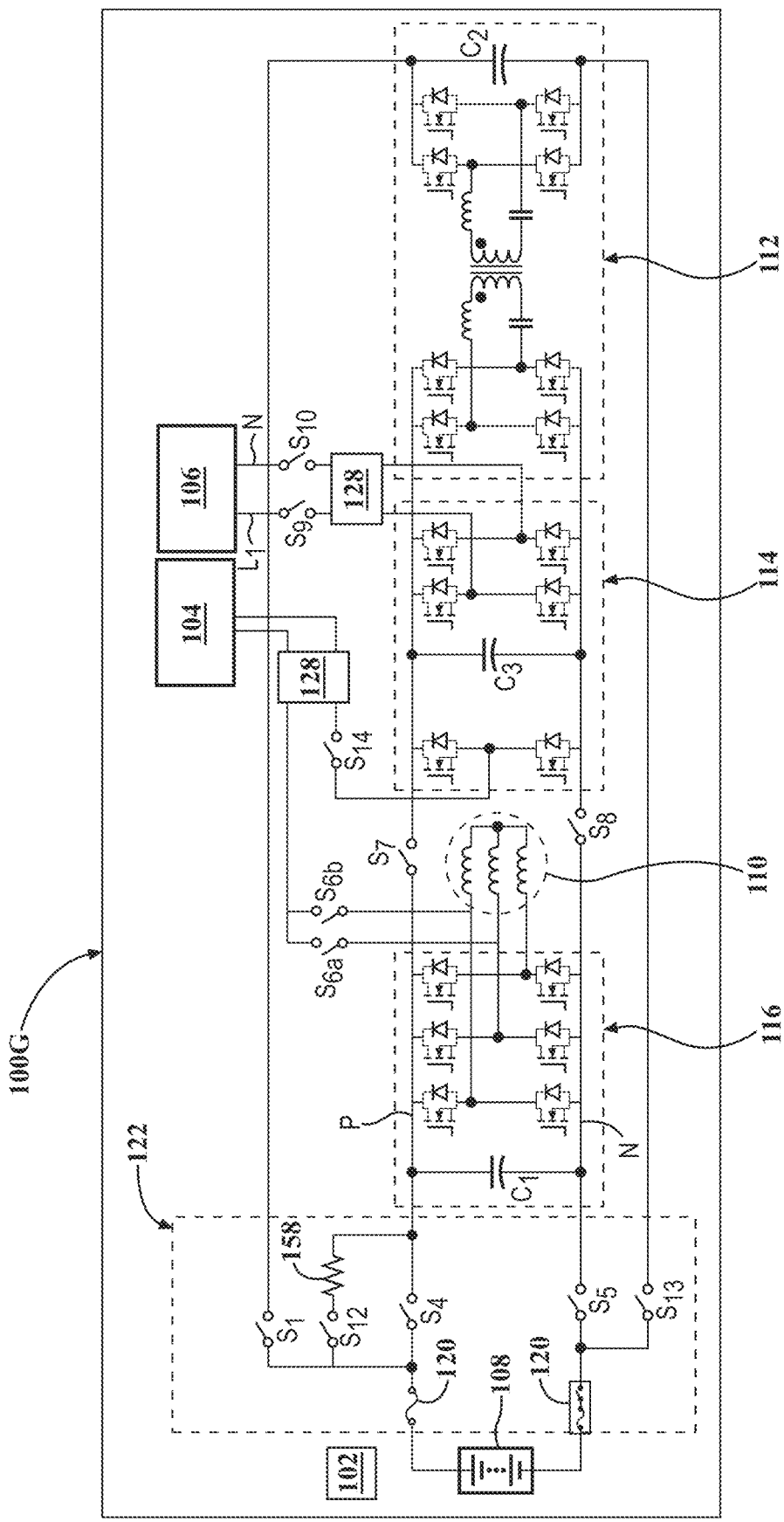
FIG. 1G is a schematic circuit diagram of an onboard charging system of an electric vehicle in accordance with the principles of the present disclosure.

In one configuration, as shown in FIG. 1G, the DC-AC converter 114 includes a capacitor $C_3$, a single-phase inverter, and one or more AC filters 128. The AC filter 128 is used to filter out high frequency signals and electromagnetic compatibility (EMC). The AC filter 128 may also be included in the same or similar location in the onboard charging systems 100, 100A-100F shown in FIGS. 1A-1F.

In some configurations, the one or more fuses 120 are disposed adjacent to the terminals of the battery 108 and are configured to prevent damage to the battery 108 by preventing current flow in excess of a threshold level into or out of the battery 108. In one configuration, the one or more pre-charge resistors 118 are disposed between one of the switches, such as the third switch $S_3$, and the bidirectional inverter 116. The pre-charge resistors 118 may be configured to slowly charge the capacitors $C_1$ and/or $C_5$ of the bidirectional inverter 116 before the bidirectional inverter 116 is powered up and to prevent a large about of current into the bidirectional inverter 116.

The various configurations of the onboard charging systems 100, 100A-100G shown in FIGS. 1A-1G are provided as examples of onboard charging systems and are not intended to be limiting. Those of ordinary skill in the art can and will appreciate that other configurations of the on-board charging systems 100 in accordance with principles of the present disclosure are possible.

Figure 2:
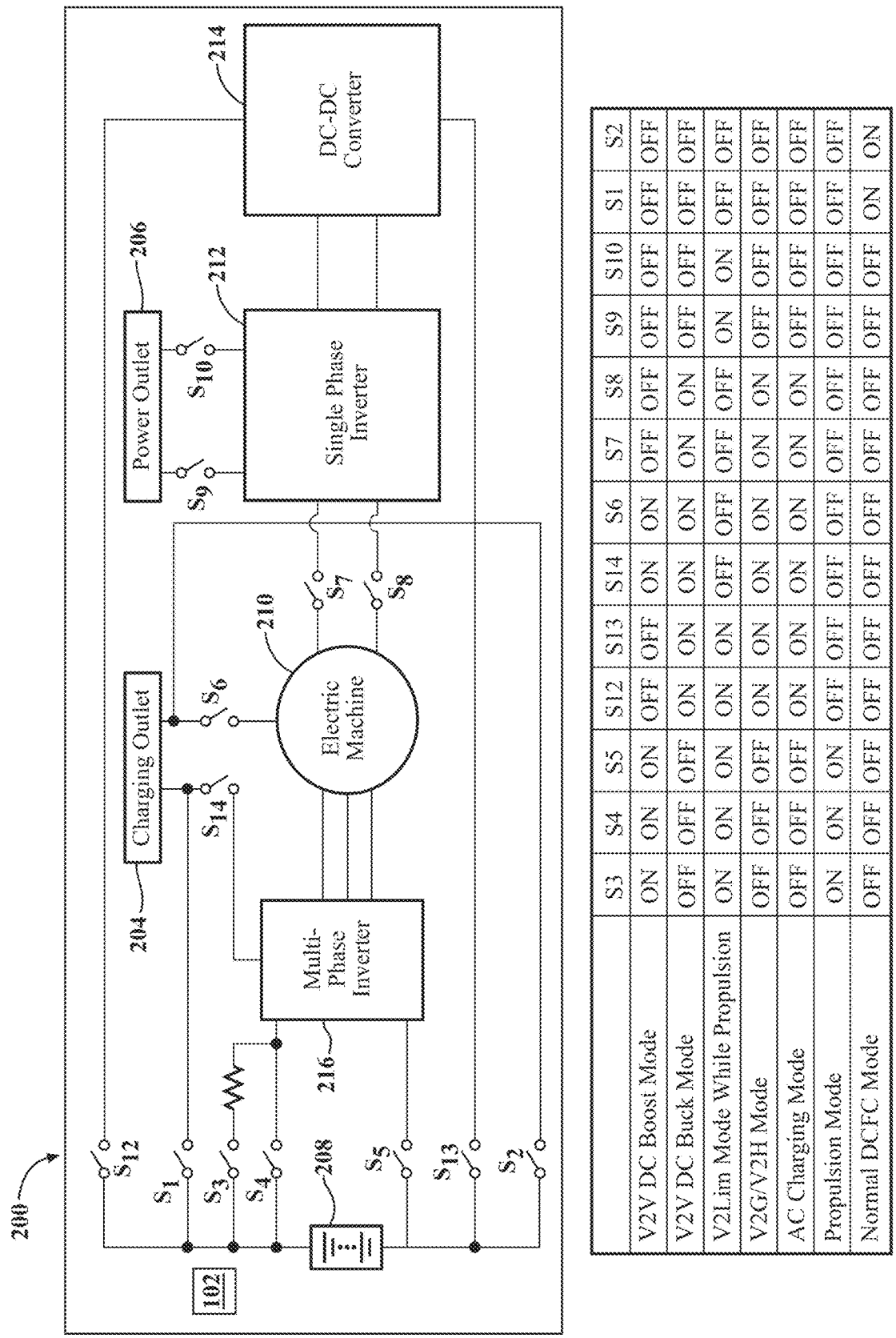
FIG. 2 is a schematic diagram of an onboard charging system in accordance with the principles of the present disclosure.

Referring to FIG. 2, an example of an onboard charger system 200 is illustrated in accordance with aspects of the present disclosure. As illustrated, the onboard charging system 200 includes a processor 202, a charging port 204, a power outlet 206, a battery 208, an electric motor 210, a DC-AC converter 212, a DC-DC converter 214, a bidirectional inverter 216, and one or more switches $S_1$-$S_n$.

The charging port 204 may be configured to receive a single-phase AC power, a three-phase alternating current (AC) power, or direct current DC (e.g., direct current fast charging) from a charging source. In one configuration, the single-phase AC power has a voltage between eighty-five and three-hundred and ten volts. In another configuration, the three-phase AC power and/or direct current for fast charging has a voltage between three hundred and nine hundred volts. In one configuration, the charging port 204 includes one or more sensors (not shown) that are configured to detect that a charging source has been connected to the charging port 204. In one configuration, the sensors are in communication with the processor 202. As will be discussed in one or more configurations below, a positive terminal of the charging port 204 may be selectively coupled to the bidirectional inverter 216, the electric motor 210, and/or the DC-AC converter 212 via a fourteenth switch $S_{14}$. Additionally, the charging port 204 can be selectively coupled to the battery 208 via a first switch $S_1$ and a second switch $S_2$.

The power outlet 206 is selectively coupled to the DC-AC converter 212 via a ninth switch $S_9$, and a tenth switch $S_{10}$. The power outlet 206 may be configured to provide single-phase AC power to one or more mobile devices while the vehicle is traveling and at rest, for example. In one configuration, the single-phase AC power has a Root mean square (rms) voltage between one hundred and twenty and two hundred and seventy volts. The DC-AC converter 212 may also be selectively coupled to the electric motor 210 via a seventh switch $S_7$ and an eighth switch $S_8$.

The battery 208 may be a direct current (DC) battery that is a high voltage battery and has a capacity of greater than approximately three hundred volts. In one configuration, the battery is a Lithium-ion battery. The battery 208 can include one or more NCM (Lithium Nickel Manganese Cobalt Oxide) battery cells, one or more LFP (Lithium Iron Phosphate) battery cells and other type of battery cells.

The bidirectional inverter 216 is configured to convert AC power to DC power and to convert DC power to AC power. The bidirectional 216 inverter is selectively coupled to the DC battery 208 by a third switch $S_3$, a fourth switch $S_4$, and a fifth switch $S_5$. The term "bidirectional" indicates that the bidirectional inverter 216 can operate in both directions, allowing power to flow in and out of the battery 208.

In the AC-to-DC mode, or rectification mode, the bidirectional inverter 216 converts AC power from the electric motor 210 into DC power. The AC input from the electric motor 210 is connected to the bidirectional inverter 216, which is connected to DC-AC converter 212 and the DC-DC converter 214. The isolated DC-DC converter 214 is connected to the battery 208 via a twelfth switch $S_{12}$ and a thirteenth switch $S_{13}$. A rectifier of the bidirectional inverter 216 converts the AC input into DC using power electronic switches (e.g., insulated gate bipolar transistors or IGBTs).

In the DC-to-AC mode, or inversion mode, the bidirectional inverter 216 converts DC power from the battery 208 into AC power. The DC output from the battery 208 is connected to the bidirectional inverter 216 via the fifth switch $S_5$. The inverter of the bidirectional inverter 216 converts the DC input into AC using power electronic switches (e.g., insulated gate bipolar transistors (IGBTs), wideband gap switches, or the like). For example, the bidirectional inverter 216 can use pulse-width modulation (PWM) techniques to convert the DC power into a high-frequency AC waveform. In some configurations, the bidirectional inverter 216 includes a control circuit that regulates the AC output voltage and frequency to match the requirements of the electric motor 210.

The onboard charging system 200 can utilize the electric motor 210 to provide propulsion to the electric vehicle and to charge the battery 208, for example. In one configuration, the electric motor 210 is selectively coupled to the charging port 204 by a sixth switch $S_6$. In some configurations, AC power can be provided to stator windings of the electric motor 210 or to a neutral point of the stator windings of the electric motor 210. The stator winding can act as an inductor for the provided AC power.

The processor 202 controls the operation (i.e., opening and/or closing) of the switches of the onboard charging system 200 (i.e., opens and closes switches depending on the operation mode of the vehicle 10). Several operational modes of the onboard charging system are provided below.

In vehicle-to-vehicle (V2V) DC boost mode of the electric vehicle, the processor 202 first closes the third switch $S_3$ and the fifth switch $S_5$ to pre-charge the capacitor of inverter 216, then open the third switch $S_3$ and close the fourth switch $S_4$, the fourteenth switch $S_{14}$, and the sixth switch $S_6$, allowing DC power to flow from the charging port 204 through the electric motor 210 and the bidirectional inverter 216, which provides DC power to the battery 208.

In vehicle-to-vehicle (V2V) buck mode of the electric vehicle, the processor 202 closes the twelfth switch $S_{12}$, the thirteenth switch $S_{13}$, the fourteenth switch $S_{14}$, the sixth switch $S_6$, the seventh switch $S_7$, and the eighth switch $S_8$, allowing DC power to flow from the charging port 204 through the electric motor 210 and the bidirectional inverter 216, and then the DC-DC converter 214 converts DC power to the voltage level which is compatible to battery 208 and then charges battery 208.

In vehicle-to-load inverter module (V2Lim) mode of the electric vehicle, the processor 202 closes the twelfth switch $S_{12}$, the thirteenth switch $S_{13}$, the ninth switch $S_9$, and the tenth switch $S_{10}$, allowing DC power to flow from the DC-DC converter 214 to the DC-AC converter 212 so that AC power is provided to the power outlet 206.

In vehicle-to-load inverter module (V2Lim) mode during propulsion of the electric vehicle, the processor 202 closes the fourth switch $S_4$, the fifth switch $S_5$, the twelfth switch $S_{12}$, the thirteenth switch $S_{13}$, the ninth switch $S_9$, and the tenth switch $S_{10}$, allowing DC power to flow from the battery 208 to the inverter 216 for the motor 210 to provide propulsion. Additionally, DC power flows from the DC-DC converter 214 to the DC-AC converter 212 so that AC power is provided to the power outlet 206.

In vehicle-to-load inverter module (V2Lim) mode while charging the electric vehicle, the processor 202 closes the seventh switch $S_7$, the eighth switch $S_8$, the sixth switch $S_6$, the fourteenth switch $S_{14}$, the ninth switch $S_9$, the tenth switch $S_{10}$, the twelfth switch $S_{12}$, and the thirteenth switch $S_{13}$, allowing AC power to flow from charging port to the inverter 216 and motor 210. During this operation, the inverter 216 is in rectifier mode while the machine stator winding functions as an inductor to convert AC power to DC power. Then the DC-DC converter 214 converts the DC power to the voltage level which is compatible with the battery 208 to charge the battery 208. Additionally, DC power out of the motor 210 and inverter 216 flows from the DC-AC converter 212 to power outlet 206 so that AC power is provided to the power outlet 206.

In vehicle-to-grid (V2G) or vehicle-to-home (V2H) mode of the electric vehicle, the processor 202 switches on the twelfth switch $S_{12}$, the thirteenth switch $S_{13}$, the fourteenth switch $S_{14}$, the sixth switch $S_6$, the seventh switch $S_7$, the eighth switch $S_8$, allowing DC power to flow from the battery 208 to the DC-DC converter 214 through the DC-AC converter 212 to the electric motor 210 and inverter 216 where DC power is converted to AC power and output to gird or home through the charge port 204.

In AC charging mode of the electric vehicle, the processor 202 closes the twelfth switch $S_{12}$, the thirteenth switch $S_{13}$, the fourteenth switch $S_{14}$, the sixth switch $S_6$, the seventh switch $S_7$, and the eighth switch $S_8$, allowing AC power to flow from the charging port 204 to the electric motor 210 and inverter 216. During this operation, the inverter 216 is in rectifier mode while the machine stator winding functions as an inductor to convert AC power to DC power. Then the DC-DC converter 214 converts the DC power to the voltage level which is compatible with the battery 208 to charge the battery 208.

In propulsion mode of the electric vehicle, the processor 202 first closes the third switch $S_3$ and the fifth switch $S_5$ to pre-charge the capacitor of inverter 216, and then the processor 202 opens the third switch $S_3$ and closes the fourth switch $S_4$, allowing DC power to flow from the battery 208 through the bidirectional inverter 216, which provides AC power to the electric motor 210.

In normal direct current fast charging (DCFC) mode of the vehicle 10, the processor 202 closes the first switch $S_1$ and the second switch $S_2$, allowing DC power to flow from the charging port 204 to the battery 208.

In some configurations, more than one mode may be simultaneously utilized. For instance, the processor 202 can close the twelfth switch $S_{12}$, the thirteenth switch $S_{13}$, the ninth switch $S_9$, the tenth switch $S_{10}$, the first switch $S_1$, and the second switch $S_2$, so that normal direct current fast charging and vehicle-to-load inverter module mode can be utilized at the same time. In other words, a passenger can utilize the power outlet 206 to charge a personal device (e.g., a cell phone or computer) while charging the battery 208 of the vehicle 10.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:
1. An electric vehicle, comprising:
a charging port configured to receive a single-phase alternating current (AC) power;
a power outlet configured to provide the single-phase AC power to one or more external devices;
a single-phase inverter connected to the power outlet to convert direct current (DC) power to single-phase AC power;
a DC battery selectively coupled to the charging port via a first switch and a second switch;
a bidirectional inverter configured to convert AC power to DC power and to convert DC power to AC power, the bidirectional inverter is selectively coupled to the battery via a third switch, a fourth switch, and a fifth switch;
an electric motor coupled to the bidirectional inverter and selectively coupled to the charging port via a sixth switch;
a DC-AC converter selectively coupled to the electric motor via a seventh switch and an eighth switch and selectively coupled to the power outlet via a ninth switch, and a tenth switch;
a DC-DC converter coupled to the DC-AC converter and selectively coupled to the battery via a twelfth switch and a thirteenth switch;

wherein the charging port is selectively coupled to the bidirectional inverter, the electric motor, or the DC-AC converter via a fourteenth switch; and a processor configured to control operation of the first switch, the second switch, the third switch, the fourth switch, the fifth switch, the sixth switch, the seventh switch, the eighth switch, the ninth switch, the tenth switch, the twelfth switch, the thirteenth switch, and the fourteenth switch based on an operation mode of the electric vehicle.

2. The electric vehicle of claim 1, wherein the single-phase AC power is 120 Vrms AC power.

3. The electric vehicle of claim 2, wherein during a vehicle to vehicle DC boost mode of the electric vehicle, the processor causes the first switch, the second switch, the third switch, the seventh switch, the ninth switch, the tenth switch, the twelfth switch, and the thirteenth switch to be in an open position and the fourth switch, the fifth switch, the sixth switch, and the fourteenth switch to be in a closed position.

4. The electric vehicle of claim 2, wherein during a vehicle to vehicle buck mode of the electric vehicle, the processor causes the first switch, the second switch, the third switch, the fourth switch, the fifth switch, the ninth switch, and the tenth switch to be in an open position and the sixth switch, the seventh switch, the eighth switch, the twelfth switch, the thirteenth switch, the fourteenth switch, to be in a closed position.

5. The electric vehicle of claim 2, wherein during a vehicle to load inverter module mode of the electric vehicle, the processor causes the first switch, the second switch, the third switch, the fourth switch, the fifth switch, the sixth switch, the seventh switch, the eighth switch, and the fourteenth switch to be in an open position and the ninth switch, the tenth switch, the twelfth switch, and the thirteenth switch to be in a closed position.

6. The electric vehicle of claim 2, wherein during a vehicle to grid of the electric vehicle, the processor causes the first switch, the second switch, the third switch, the fourth switch, the fifth switch, the ninth switch, and the tenth switch to be in an open position and the sixth switch, the seventh switch, the eighth switch, the twelfth switch, the thirteenth switch, and the fourteenth switch to be in a closed position.

7. The electric vehicle of claim 2, wherein during a vehicle to home of the electric vehicle, the processor causes the first switch, the second switch, the third switch, the fourth switch, the fifth switch, the ninth switch, and the tenth switch to be in an open position and the sixth switch, the seventh switch, the eighth switch, the twelfth switch, the thirteenth switch, and the fourteenth switch to be in a closed position.

8. The electric vehicle of claim 2, wherein during an AC charging mode of the electric vehicle, the processor causes the third switch, the fourth switch, the fifth switch, the ninth switch, the tenth switch, the first switch, and the second switch to be in an open position and the twelfth switch, the thirteenth switch, the fourteenth switch, the sixth switch, the seventh switch, and the eighth switch to be in a closed position.

9. The electric vehicle of claim 2, wherein during a propulsion mode of the electric vehicle, the processor causes the first switch, the second switch, the sixth switch, the seventh switch, the eighth switch, the ninth switch, the tenth switch, the twelfth switch, the thirteenth switch, and the fourteenth switch to be in an open position and first close the third switch, and the fifth switch to pre-charge the inverter capacitor and then open third switch and close fourth.

10. The electric vehicle of claim 2, wherein during a direct current fast charging mode of the electric vehicle, the processor causes the third switch, the fourth switch, the fifth switch, the sixth switch, the seventh switch, the eighth switch, the ninth switch, the tenth switch, the twelfth switch, the thirteenth switch, and the fourteenth switch to be in an open position and the first switch and the second switch to be in a closed position.

11. An onboard charging system for an electric vehicle, the onboard charging system comprising:

a charging port configured to receive a single-phase alternating current (AC) power;

a power outlet configured to provide the single-phase AC power to one or more external devices;

a single-phase inverter connected to the power outlet and configured to provide power splitting functionality;

a direct current (DC) battery selectively coupled to the charging port via a first switch and a second switch;

a bidirectional inverter configured to convert AC power to DC power and to convert DC power to AC power, the bidirectional inverter is selectively coupled to the battery via a third switch, a fourth switch, and a fifth switch;

an electric motor coupled to the bidirectional inverter and selectively coupled to the charging port via a sixth switch;

a DC-AC converter selectively coupled to the electric motor via an seventh switch and an eighth switch and selectively coupled to the power outlet via a ninth switch, and a tenth switch; and a DC-DC converter coupled to the DC-AC converter and selectively coupled to the battery via a twelfth switch and a thirteenth switch; and wherein the charging port is selectively coupled to the battery via the thirteenth switch.

12. The onboard charging system of claim 11, wherein the single-phase AC power is 120 Vrms AC power.

13. The onboard charging system of claim 11, wherein a positive terminal of the charging port is selectively coupled to a stator winding of the electric motor between the bidirectional inverter and the electric motor via the sixth switch, and a negative terminal of the charging port is selectively coupled between capacitors of the bidirectional inverter via a fourteenth switch.

14. The onboard charging system of claim 11, wherein a positive terminal of the charging port is selectively coupled to three sub switches via the sixth switch, the three sub switches are each selectively coupled to separate stator windings of the electric motor.

15. The onboard charging system of claim 14, further comprising a processor that is configured to monitor temperatures of the stator windings and selectively control the three sub switches to prevent any of the stator windings from exceeding a threshold temperature.

16. The onboard charging system of claim 11, wherein a positive terminal of the charging port is selectively coupled to a neutral point of stator windings of the electric motor via the sixth switch, and a negative terminal of the charging port is selectively coupled to insulated gate bipolar transistors that are connected in parallel to the bidirectional inverter, the DC-AC converter, and the DC-DC converter via a fourteenth switch.

17. The onboard charging system of claim 11, wherein a positive terminal of the charging port is selectively coupled to a neutral point of stator windings of the electric motor via the sixth switch, and a negative terminal of the charging port is selectively coupled between capacitors of the bidirectional inverter via a fourteenth switch.

18. A power splitter for an onboard charging system for an electric vehicle, the power splitter comprising:
  a single-phase inverter connected to a power outlet of the onboard charging system, the onboard charging system comprising:
    a charging port configured to receive a single-phase alternating current (AC) power;
    a single-phase inverter connected to the power outlet and configured to provide power splitting functionality;
    a direct current (DC) battery selectively coupled to the charging port via a first switch and a second switch;
    a bidirectional inverter configured to convert AC power to DC power and to convert DC power to AC power, the bidirectional inverter is selectively coupled to the battery via a third switch, a fourth switch, and a fifth switch;
    an electric motor coupled to the bidirectional inverter and selectively coupled to the charging port via a sixth switch;
    a DC-AC converter selectively coupled to the electric motor via an seventh switch and an eighth switch and selectively coupled to the power outlet via a ninth switch, and a tenth switch; and
    a DC-DC converter coupled to the DC-AC converter and selectively coupled to the battery via a twelfth switch and a thirteenth switch; and
    wherein the charging port is selectively coupled to the battery via the thirteenth switch.

19. The power splitter of claim 18, wherein one or more pre-charge resistors are disposed between the third switch and the bidirectional inverter.

20. The power splitter of claim 18, wherein the single-phase AC power is 120 Vrms AC power.

* * * * *